N. O. NELSON.
SLEIGH ATTACHMENT FOR AUTOS.
APPLICATION FILED DEC. 7, 1920.

1,392,438.

Patented Oct. 4, 1921.

Inventor
Nordahl O. Nelson.

By E. E. Vrooman & Co.,
his Attorneys

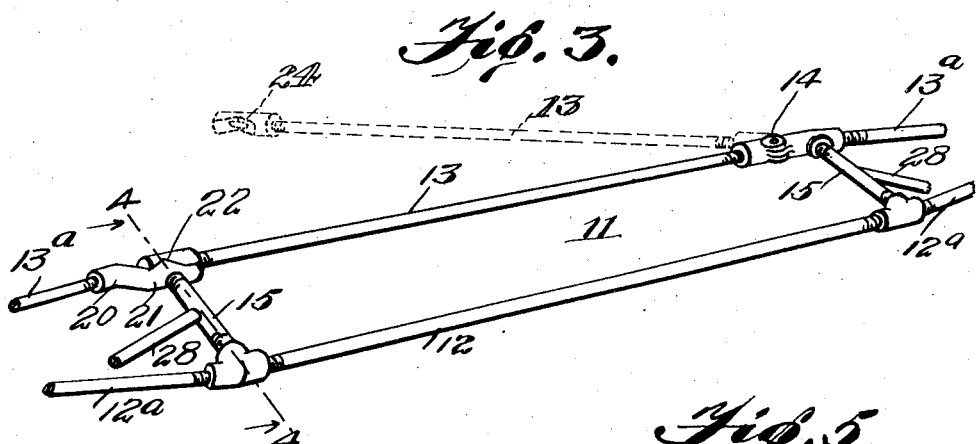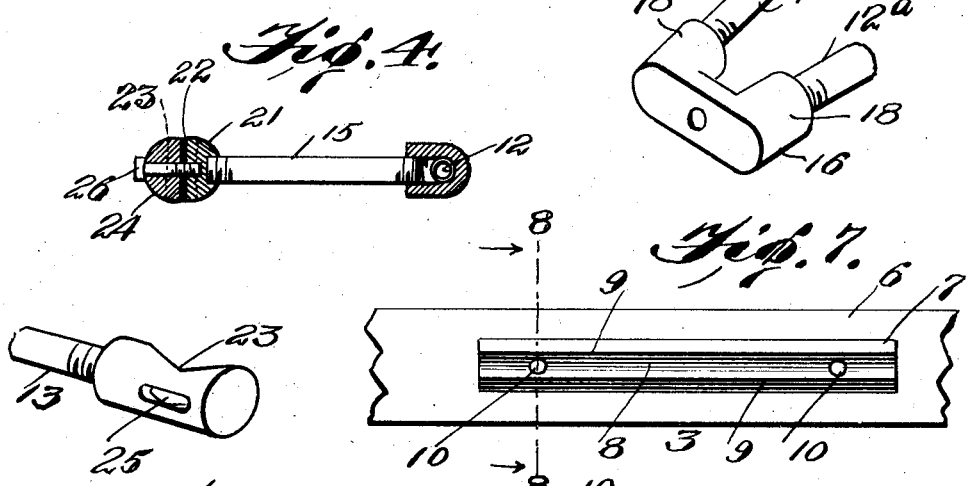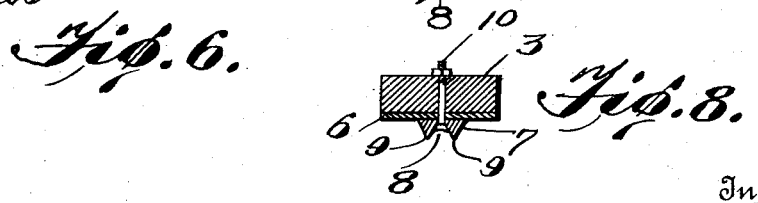

UNITED STATES PATENT OFFICE.

NORDAHL O. NELSON, OF WESTBY, WISCONSIN.

SLEIGH ATTACHMENT FOR AUTOS.

1,392,438.    Specification of Letters Patent.   Patented Oct. 4, 1921.

Application filed December 7, 1920. Serial No. 428,939.

*To all whom it may concern:*

Be it known that I, NORDAHL O. NELSON, citizen of the United States, residing at Westby, in the county of Vernon and State of Wisconsin, have invented certain new and useful Improvements in Sleigh Attachments for Autos, of which the following is a specification, reference being had therein to the accompanying drawings.

This invention relates to a sleigh attachment to autos, and has for its object the construction of a relatively simple runner that can be quickly and efficiently attached to the wheel of an automobile or a motor vehicle.

With this and other objects in view, my invention comprises certain novel combinations, constructions and arrangements of parts as will be hereinafter described, illustrated in the accompanying drawings, and more particularly pointed out in the appended claims.

In the drawings:

Fig. 3 is a fragmentary, perspective view of the frame of the device.

Fig. 4 is a sectional view taken on line 4—4, Fig. 3, and looking in the direction of the arrows.

Fig. 5 is a fragmentary, perspective view of the frame, showing one of the socket plates.

Fig. 6 is a perspective view of the auxiliary coupling sleeve.

Fig. 7 is a fragmentary, bottom, plan view of the shoe, showing the anti-skid plate attached thereto, while—

Fig. 8 is a sectional view taken on line 8—8, Fig. 7, and looking in the direction of the arrows.

Figure 1:
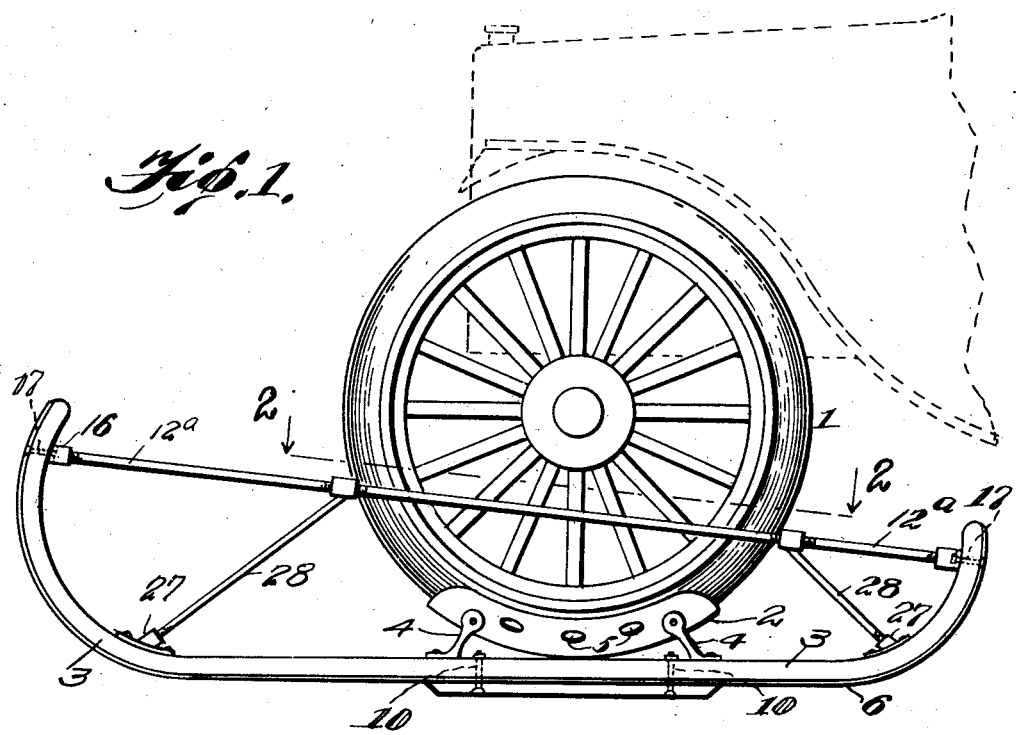
Figure 1 is a view in side elevation of a device constructed in accordance with the present invention, shown applied to a motor vehicle wheel, while—

Referring to the drawings by numerals, 1 designates the wheel of a motor vehicle that is seated in the curved, hollow holder 2 of my device; this holder 2 is supported, near its ends, upon the runner 3 by brackets 4. The holder is provided with openings or apertures 5 for decreasing its weight and allowing ready cleaning of the holder by permitting the dirt to fall through the apertures 5.

Figure 2:
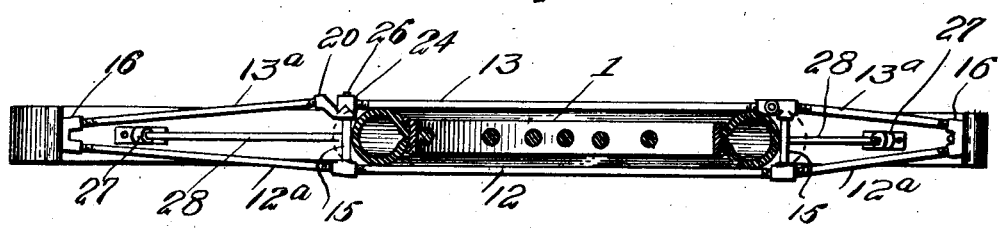
Fig. 2 is a sectional view taken on line 2—2, Fig. 1, and looking in the direction of the arrows.

The runner 3 is bent up at its ends, Fig. 2, and attached to the under face of the runner is a metal shoe 6. Near the middle of the runner, and preferably directly under the holder 2, is an anti-skid plate 7; this plate 7 is provided with a longitudinally-extending groove 8, producing pointed edges 9 that cut into the snow or ice and prevent skidding of the runner. The plate 7 is attached to the runner by bolts 10, and when the plate becomes worn, it can be detached and a new plate quickly attached, at the will of the operator.

The frame 11 of the device comprises side arms 12 and 13; the arm 12 is fixed or stationary, whereas, the arm 13 is pivotally mounted, at 14, upon the frame. Transverse bars 15 connect the sides of the frame 1, and auxiliary arms 12ª and 13ª are connected, at their outer ends, to socket plates 16, which plates 16 are fastened to the upwardly-turned or curved ends of the runner, as at 17. The arms 12ª and 13ª are screwed into socket portions 18 of the plates 16 for making the arms 12ª and 13ª detachable upon the runner. Connecting the inner end of one of the arms 13ª and an end of one of the bars 15 is a primary coupling sleeve 19. This primary coupling sleeve comprises a socket portion 20, into which the inner end of an arm 13ª is screwed, and the body 21 is provided (Fig. 3) with a V-shaped rib 22 that fits into the V-shaped socket 23 of the auxiliary coupling sleeve 24 carried by the outer end of the hinged or pivoted arm 13. The sleeve 24 is provided with an elongated aperture 25, extending longitudinally of the sleeve, for permitting the bolt or screw 26 to have a slight longitudinal adjustment within the sleeve 24 for obtaining a perfect alinement of the side arms against the sides of the wheel 1, Figs. 1 and 2; the bolt (Fig. 2) is threaded as usual upon its inner end, and extends into the V-shaped rib 22 of the primary coupling sleeve 19, Fig. 4.

Upon removing the bolt 26, the hinged arm 13 can be swung outwardly, allowing the wheel 1 to be lifted from the holder 2, which will permit the removal of the runner device in a very short time, or by swinging the arm outwardly to an open position, then placing the device against the wheel 1, lifting the wheel into the holder 2, and then moving arm 13 to its closed or fastened position, the device will have then been quickly attached to the wheel 1.

A pair of brace plates 27 are secured to the runner 3 and inclined braces 28 are screwed at their lower ends into these plates 27; the upper ends of the braces 28 are attached to the cross or transverse bars 15.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a device of the class described, the combination of a runner, a frame attached to the runner, said frame including a primary coupling sleeve and a hinged arm, said arm provided at its outer end with an auxiliary coupling sleeve, said primary coupling sleeve provided with a rib, said auxiliary coupling sleeve provided with a socket portion adapted to fit over the rib, and fastening means extending through the auxiliary coupling sleeve and into the primary coupling sleeve.

2. In a device of the class described, the combination of a runner, a frame carried by said runner, said frame including a hinged arm provided with an auxiliary coupling sleeve, said frame also including a primary coupling sleeve, said primary coupling sleeve comprising a socket portion and a body portion, said body portion provided with a V-shaped rib, said auxiliary coupling sleeve provided with a V-shaped socket and with an elongated aperture extending longitudinally of the sleeve, and a bolt adjustably positioned in the elongated aperture and threaded into the V-shaped rib, substantially as shown and described.

3. In a device of the class described, the combination of a runner, a frame carried by said runner and including a hinged arm and a primary coupling sleeve, said frame provided with an arm and a bar screwed into said coupling sleeve at substantially right angles to each other, said hinged arm provided with an auxiliary coupling sleeve, and means on the primary and auxiliary sleeves for fastening them together in true alinement with the rest of the frame when a wheel is supported by the runner and positioned within the frame.

In testimony whereof I hereunto affix my signature.

NORDAHL O. NELSON.